United States Patent [19]

Lacy

[11] 4,121,842
[45] Oct. 24, 1978

[54] EXPANSION SEAL

[75] Inventor: Thomas H. Lacy, 3079 Myrtle Ave., Baton Rouge, La. 70806

[73] Assignee: Thomas H. Lacy, Baton Rouge, La.

[21] Appl. No.: 755,350

[22] Filed: Dec. 29, 1976

[51] Int. Cl.² .................................................. B65D 53/02
[52] U.S. Cl. .................................... 277/112; 285/348
[58] Field of Search ............... 277/72 FM, 103, 108, 277/112; 285/15, 158, 192, 348; 138/99; 220/3

[56] References Cited

U.S. PATENT DOCUMENTS

| | | | |
|---|---|---|---|
| 636,083 | 10/1899 | Sweetser | 220/3 |
| 1,805,155 | 5/1931 | Weeks | 277/72 FM |
| 1,946,494 | 2/1934 | Harton | 220/3 |
| 2,373,280 | 4/1945 | Weber | 277/102 |
| 2,394,402 | 2/1946 | Pennella | 277/102 |
| 2,567,243 | 9/1951 | Smith | 285/348 |
| 3,393,917 | 7/1968 | Kendall | 277/103 |
| 3,398,964 | 8/1968 | Trefil | 277/72 FM |
| 3,997,199 | 12/1976 | Arnold | 285/348 |

*Primary Examiner*—Herbert F. Ross
*Attorney, Agent, or Firm*—LeBlanc & Shur

[57] ABSTRACT

An expansion seal for use with a product pipeline which extends through a larger casing is disclosed. The seal may also be adapted to function as a coupling if a leak occurs in the product pipeline. The device comprises a cap having an axial opening to receive a sleeve which then surrounds the pipeline. The periphery of the cap is adapted to be welded to the casing end. The sleeve defines an internal circumferential recess which contains packing, and the sleeve carries means for compressing the packing into sealing engagement between the pipeline and sleeve. The device may function as a coupling by welding the sleeve to the pipeline.

3 Claims, 6 Drawing Figures

EXPANSION SEAL

This invention relates to an expansion seal which will allow thermal or chemical expansion of a product pipeline inside a larger casing. The seal may be used for example in road crossings, stream crossings, or the like, where movement of one line inside another line is required, and is specifically adapted to maintain sealing engagement between two lines where pressure is maintained in both lines.

The use of casings to surround product pipelines to provide thermal or mechanical insulation or to carry another object, or to protect the pipeline, is well-known. However, application when allowance for thermal or chemical expansion must be provided has been inhibited by the lack of an effective seal which will permit movement of the pipeline relative to the casing.

It has now been discovered, however, that an efficient seal can be provided according to this invention wherein the seal assembly is mounted on the end of the casing with the product pipeline extending therethrough, and deformable packing housed in a sleeve adapted to surround the pipeline may be utilized to allow movement of the pipeline relative to the casing, while maintaining sealing engagement therebetween.

In addition, the seal may be utilized in case of an emergency leak in the product pipeline, within the casing, as a coupling by welding the sleeve to the product pipeline. While in this condition, the device no longer functions as an expansion seal, the resulting coupling will avoid possible emergencies which could have been caused by the leak.

In addition, the device of this invention utilizes external adjusting bolts, and a ring disposed internally to said sleeve to provide for adjustment of the seal. By rotating the bolts against the ring, said ring is urged against the deformable packing material to urge said material into sealing engagement between the sleeve and the product pipeline.

In an alternative embodiment, filling means may be provided on the sleeve in communication with the recess therein adapted to retain packing material for pumping liquid packing into said recess. Furthermore, a second means may be provided for attachment of a bleed valve to bleed the outer casing in the event leakage occurs. The type of packing utilized will depend, as will be obvious to those skilled in the art, on the nature of the material in the product pipeline or in the casing.

The use of adjustment bolts to deform a gasket has been a feature of connector sleeves utilized in pipeline construction. See for example, U.S. Pat. Nos. 2,567,243; 2,647,769; 2,703,111; and 2,747,900. In the aforementioned devices, both axially directed, and radially directed set screws are utilized. In contrast, the instant invention incorporates only axially directed adjustment bolts whereby the packing material is deformed to provide a seal without restricting movement of the product pipeline relative to the surrounding casing.

Accordingly, it is an object of this invention to provide an expansion seal for a product line disposed within a casing which will efficiently allow for thermal or chemical expansion while additionally providing a seal.

It is another object to provide an expansion seal which may be modified in the event of a leak to couple a product pipeline to a casing disposed therearound and thereby avoid an emergency situation which could be caused by said leak.

It is yet another object to provide a seal for a product pipeline which may function to permit expansion or movement of the pipeline without regard for whether the line is disposed horizontally, vertically, or above or below ground.

It is yet another object to provide an expansion seal adapted to connect product pipelines to a surrounding casing at an end of the casing which will permit movement of the pipeline relative to the casing while sealing the interior of the casing, which seal is externally adjustable.

These and other objects will become readily apparent with reference to the drawings and following description wherein.

Figure 1:
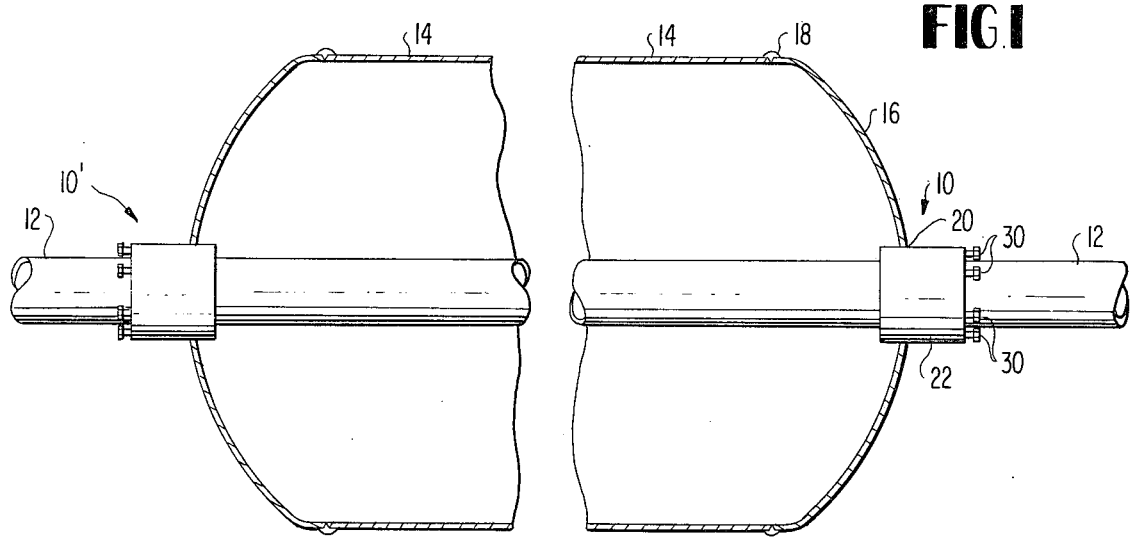
FIG. 1 is a fragmentary view of twin assemblies of this invention in partial section.
Figure 2:
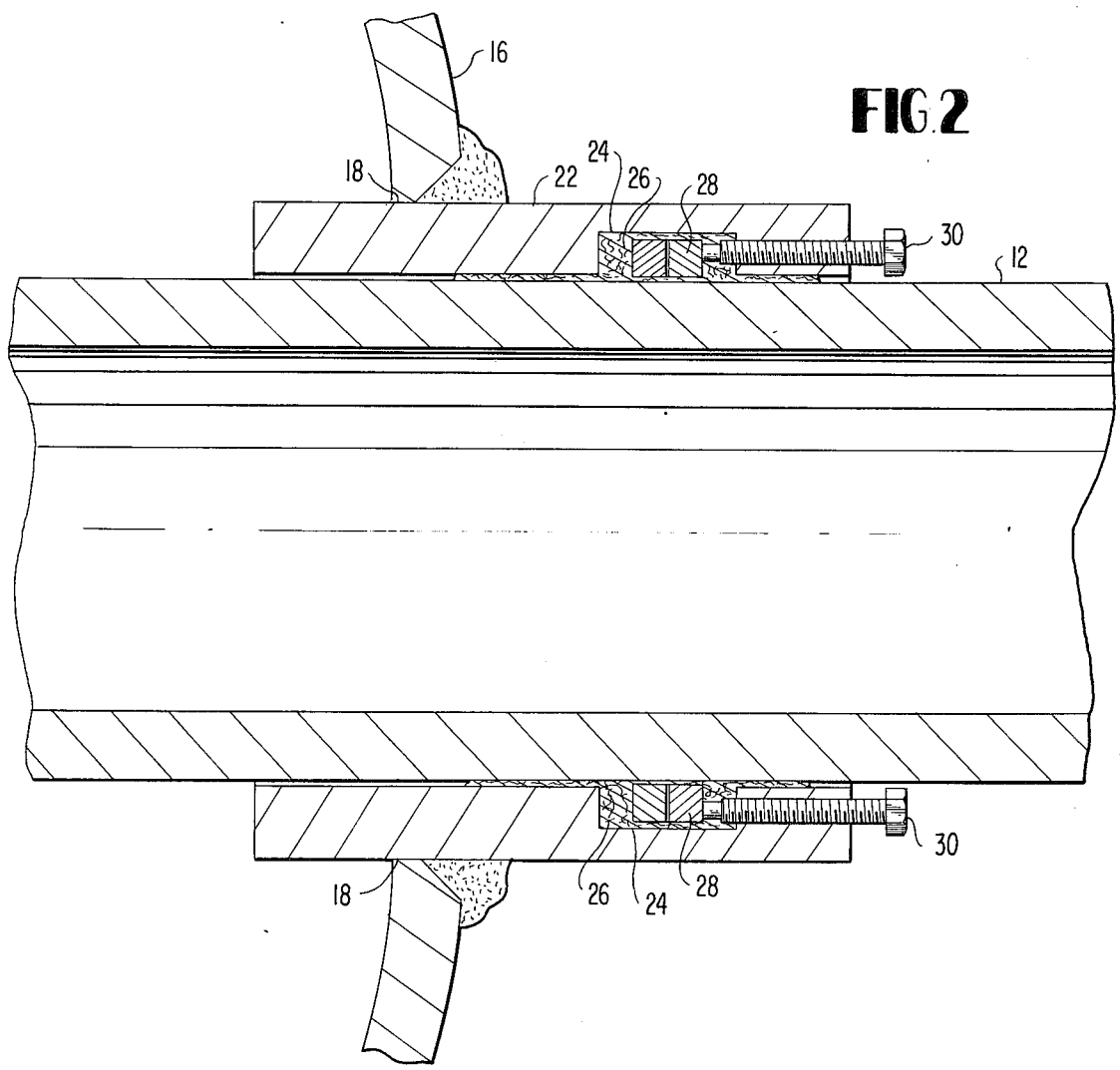
FIG. 2 is a fragmentary cross-sectional view of an embodiment of this invention.

With attention to FIGS. 1 and 2, the device of this invention, 10, is adapted to provide a seal between a product pipeline 12 and an outer casing 14. Accordingly, when utilizing the device of this invention with reference to road crossings, stream crossings, and the like, opposed twin devices 10 and 10' will be utilized.

The device of this invention includes a cap member 16, the circumference of which is welded to an end 18 of casing 14. As illustrated herein, cap 16 is essentially a convex metal piece having an axial opening 20 therein. Opening 20 receives a sleeve 22. As shown in FIG. 2, sleeve 22 is welded at opening 18 of cap 16 whereby after assembly, cap 16 and sleeve 22 are rigidly attached to an end of casing 14. Sleeve 22 defines an interior circumferential recess 24. Packing material 26 is disposed within said recess, as well as split ring assembly 28. A plurality of adjustment bolts 30 are provided. Adjustment bolts 30 extend axially through sleeve 22 into recess 24, and the ends thereof abut split ring assembly 28. In this way, by tightening bolts 30, ring assembly 28 is urged against packing 26 to thereby provide a seal between sleeve 22 and product line 12.

Figure 3:
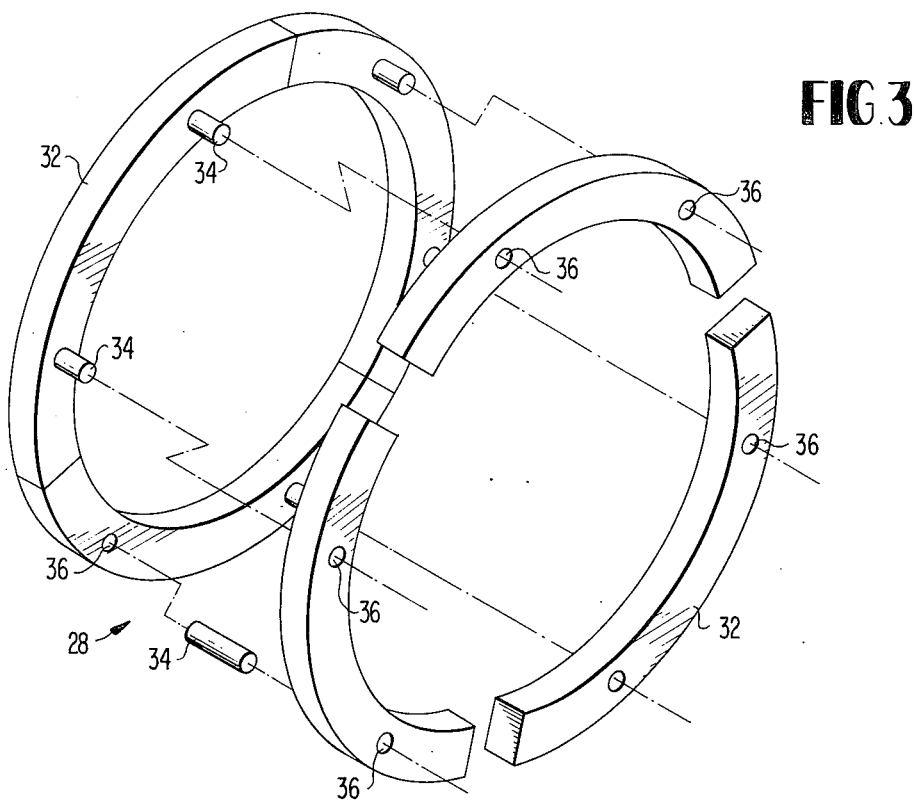
FIG. 3 is an exploded perspective view of the split ring assembly utilized to deform the sealant or packing material.

With reference to FIG. 3, in a preferred embodiment of this invention, ring assembly 28 comprises twin rings 32, the segments of which are assembled by pins 34 which extend through holes 36.

To install the expansion seal 10 of this invention, the product line 12 is first positioned to pass through the outer casing 14. The expansion seal is placed in position with the product line 12 extending through sleeve 22, but with compression screws 30 loosely inserted in sleeve 22. The product line 12 is then extended through the casing to clear the opposite end of the casing.

The necessary internal line supports (not shown) are disposed within casing 14 and an expansion seal assembly 10' is mounted on the opposite end of the casing from assembly 10. Cap 16 is then welded to the casing using welding procedures acceptable to those skilled in the art, and finally, compression screws 30 are tightened urging ring 28 against packing material 26 to provide the seal between sleeve 22 and product line 12. A similar procedure is repeated at the opposite end of casing 14 with assembly 10'.

Figure 4:
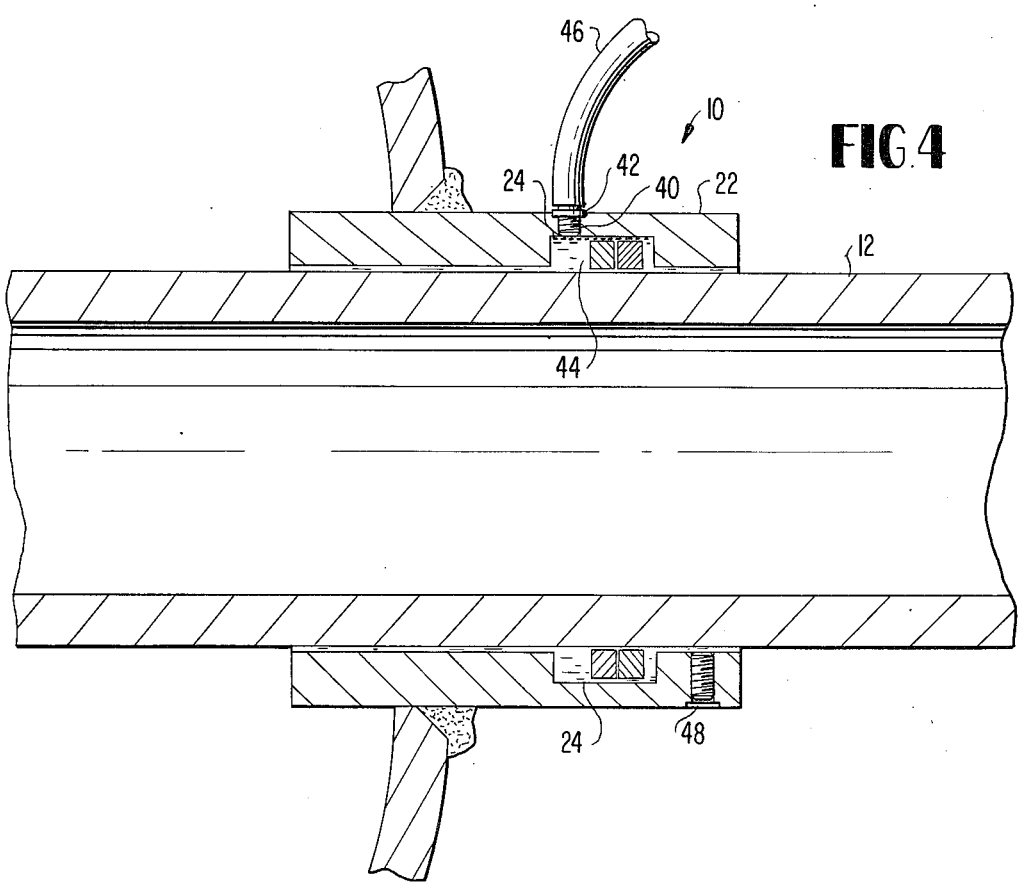
FIG. 4 is a fragmentary view in partial section of an embodiment of this invention.

In an alternative embodiment, as shown in FIG. 4, sleeve 22 may be provided with a port 40 extending into the recess 24. Port 40 may mount a fitting 42. In this manner, a liquid packing material may be pumped into recess 24 after the assembly 10 is mounted on casing 14 and product line 12. After the liquid packing material 44 is pumped through line 46 from a remote reservoir (not shown), line 46 would be removed, and a conventional plug (not shown) used to close port 40. In addition, sleeve 22 may also have a second port 48. Port 48 may normally mount a plug (not shown). However, in the event of a leak in product line 12, the plug may be removed from port 48, and a bleed valve (not shown) inserted, to bleed off the liquid or gas which has accumulated within casing 14.

Figure 5:
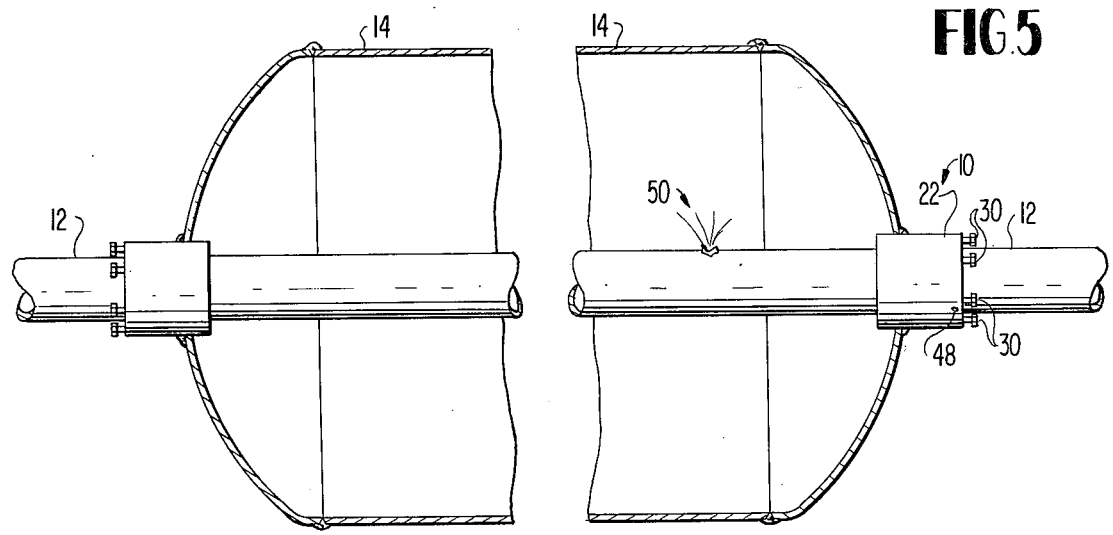
FIG. 5 is a fragmentary view of partial section of twin devices of this invention.
Figure 6:
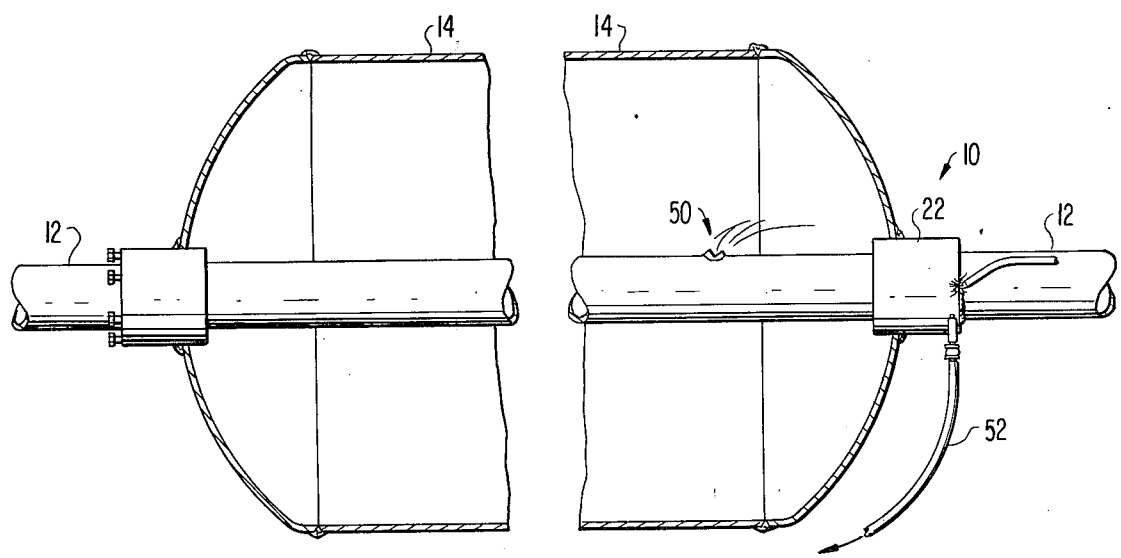
FIG. 6 is a fragmentary view in partial section of twin devices of this invention illustrating the repair of a leak.

With attention to FIGS. 5 and 6, if a leak as shown at 50 develops in product line 12, casing 14 will fill. However, as shown in FIG. 6, a bleed line 52 may be attached at port 48 to relieve the interior of casing 14 and sleeve 22. Compression screws 30 may then be severed at the surface of sleeve 22, and, as shown in FIG. 6, the sleeve 22 may be welded to product line 12 in the conventional fashion. In this manner, an unsafe situation may be rendered safe rapidly and efficiently. Although after welding the device of this invention will no longer function as an expansion seal, the device will prevent leakage which potentially could have disastrous results.

In summary then, the device of this invention comprises an expansion seal for adapting a product line to a larger casing, which device will function without regard for whether the casing is disposed vertically, horizontally, under water, or under ground. The device comprises a cap with a centrally mounted sleeve for receiving the product line. The sleeve includes a circumferential recess which mounts a split compression ring assembly. Packing material is provided adjacent the ring assembly within the recess, and external compression screws are utilized to exert pressure on the packing material through the ring assembly to deform the packing material and thereby seal the space between the product line and the sleeve.

Then, in the event a leak occurs in the product line, the sleeve may be welded to the product line to thereby seal the interior of casing 14.

The invention may be embodied in other specific forms without departing from the spirit or essential characteristics thereof. The present invention is, therefore, to be considered in all respects as illustrative and not restrictive, the scope of the invention being indicated by the appended claims rather than by the foregoing description, and all changes which come within the meaning and range of equivalency of the claims are therefore, intended to be embraced therein.

What is claimed and desired to be secured by United States Letters Patent is:

1. An expansion seal for a product pipe line which extends through a casing of greater diameter which may be adapted to couple said pipeline and said casing if said pipeline leaks and causes failure of said seal comprising:
 a convex cap adapted to be welded at the periphery thereof around the circumference of an end of said casing to rigidly attach said cap and said casing, said cap having a central opening therethrough;
 a hollow cylindrical sleeve extending through said opening, the circumference of said sleeve adjacent the circumference of said opening being welded thereto to rigidly attach said cap and said sleeve, said sleeve defining an internal circumferential recess therein, said sleeve adapted to receive said product pipeline therethrough;
 a ring assembly slidably received within the recess defined within said sleeve and adapted to surround said pipeline when said pipeline extends through said sleeve;
 compression means carried by said sleeve including a plurality of bolts threadably received in a plurality of mutually spaced openings extending axially into the recess in said cylinder, the ends thereof abutting a face of said ring adjacent thereto so that when said bolts are advanced into said sleeve, the ends thereof will abut a face of said ring assembly;
 means carried by said sleeve for admitting a liquid deformable packing into said recess adjacent the face of said ring assembly opposite the face disposed abutting the ends of said bolts whereby when said pipeline extends through said sleeve said packing will form a toroidal seal between said sleeve and said pipeline when said bolts are advanced into said recess urging said ring assembly against said packing;
 bleed means carried by said sleeve means for depressurizing the interior of said sleeve between said recess and the end thereof mounting said bolts so that when said pipeline extends through said sleeve means, and said compression means and packing seal said sleeve and pipeline, and subsequently said pipeline developes a leak within said casing which causes said seal to fail, the interior of said sleeve behind said packing may be depressurized so that said sleeve may be welded to said pipeline to couple said pipeline and casing.

2. The device of claim 1 wherein said means for admitting packing to said recess includes a port extending through said sleeve into said recess.

3. The device of claim 2 wherein said means for depressurizing includes a port extending through said sleeve means adpated to receive a bleed line, said port disposed adjacent an end of said sleeve extending outwardly from said cap, between the end and the recess defined therein.

* * * * *